April 17, 1928.
H. J. HANDS
1,666,377
CELLULOSE DERIVATIVE FILM AND METHOD OF MAKING THE SAME
Filed Jan. 25, 1927   2 Sheets-Sheet 1
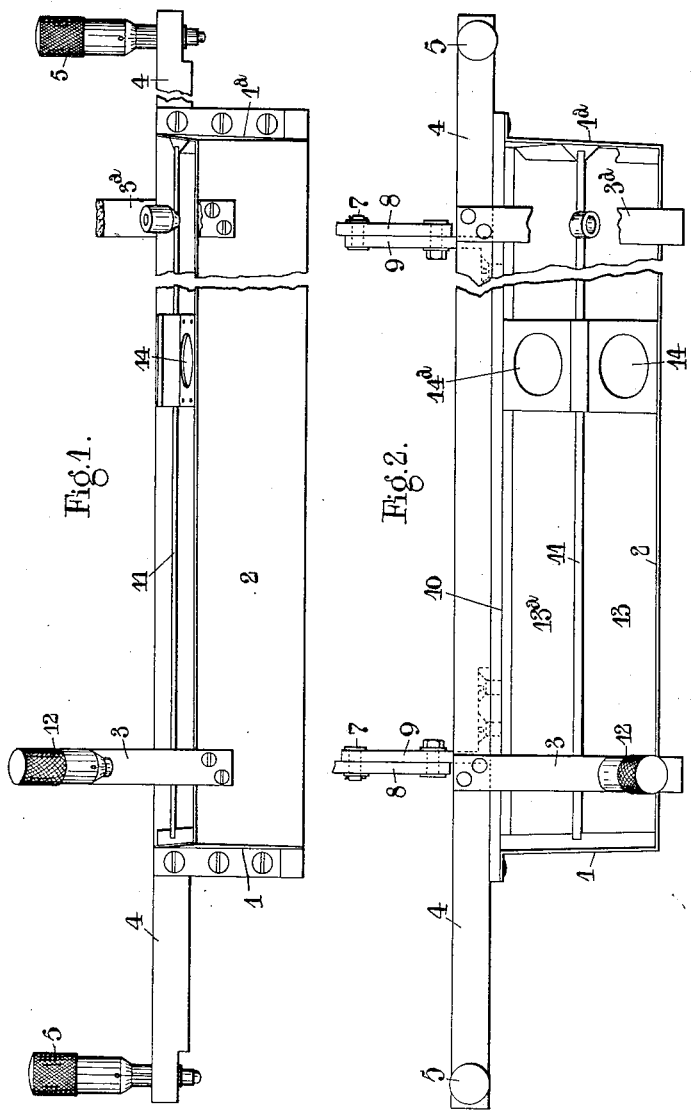

April 17, 1928. 1,666,377
H. J. HANDS
CELLULOSE DERIVATIVE FILM AND METHOD OF MAKING THE SAME
Filed Jan. 25, 1927  2 Sheets-Sheet 2
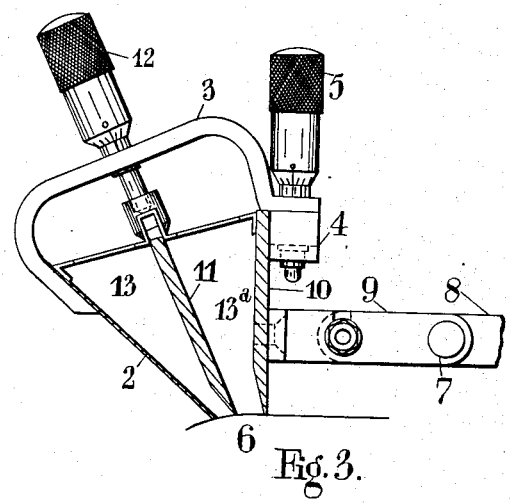
Fig. 3.
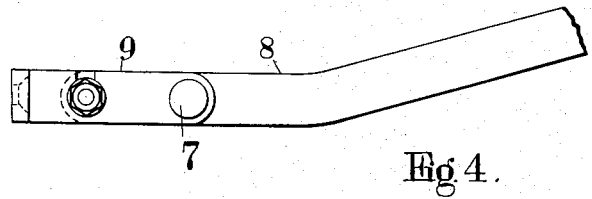
Fig. 4.
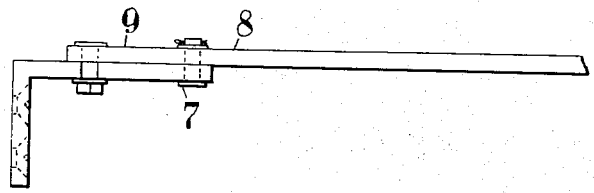
H. J. Hands
INVENTOR
By: Marks & Clerk
Attys.

Patented Apr. 17, 1928.

1,666,377

UNITED STATES PATENT OFFICE.

HENRY JAMES HANDS, OF CHISWICK, LONDON, ENGLAND, ASSIGNOR TO SPICERS, LIMITED, OF LONDON, ENGLAND.

CELLULOSE-DERIVATIVE FILM AND METHOD OF MAKING THE SAME.

Application filed January 25, 1927, Serial No. 163,540, and in Great Britain September 24, 1926.

This invention relates to cellulose ester or cellulose ether compositions in the form of sheets, pellicles and films and particularly to sheets, pellicles and films of the compositions in question designed to be coated with light sensitive compositions for use for ordinary photographic or cinematographic purposes.

One object of the present invention is to provide sheets, pellicles or films adapted to oppose a resistance to the distorting tension set up by coatings, such for instance as sensitized gelatine or collodion, which may be applied subsequently to the film.

The invention consists broadly in sheets, pellicles or films formed from cellulose ester or cellulose ether compositions in which the constitution or properties of the material vary in a progressive or gradual manner between their opposite faces; in other words, in cross-section the sheet, pellicle or film in accordance with the invention will vary in constitution and/or mechanical or physical properties progressively or gradually from one side to the other side.

The invention further consists in cellulose ester or cellulose ether compositions in the form of sheets, pellicles or films of the character hereinafter described.

The invention further consists in the method of forming sheets, pellicles or films of cellulose ester or cellulose ether compositions by the application to a support from which the final product is stripped, in succession and in superposition of a plurality of cellulose ester or cellulose ether compositions containing volatile solvents adapted to yield on evaporation of the volatile solvents cellulose ester or cellulose ether compositions differing in mechanical or physical properties, characterized in this that the compositions are applied in substantially immediate succession, that is to say a second composition is applied on to the surface of the layer of composition first or previously applied before any portion or any material portion of the solvent has evaporated from the composition first or previously applied.

The invention further consists in apparatus adapted for use in forming sheets, pellicles or films of cellulose ester or cellulose ether compositions comprising a support from which the sheet, pellicle or film may be finally stripped and means for applying to said support in superposition and in substantially immediate succession, that is to say a second or subsequent composition is applied on to the surface of a previously applied composition before any portion or any material portion of the solvent has evaporated from the previously applied composition, a plurality of cellulose ester or cellulose ether compositions containing volatile solvents adapted to yield on evaporation of the solvent compositions differing in physical or mechanical properties.

One form of apparatus in accordance with the invention comprises a support, means for applying in succession to said support cellulose ester or cellulose ether compositions containing volatile solvents and means adapted to secure relative motion between the support and the means for supplying cellulose ester or cellulose ether compositions thereto.

The support may be of the character employed in the known band or wheel machines used in the production of sheets, pellicles or films of cellulose ester or cellulose ether compositions.

Thus, in accordance with the invention, the apparatus may comprise a moving support on to which the cellulose ester or cellulose ether compositions are deposited and from which they may be stripped, a plurality of reservoirs for the compositions extending at right angles to the direction of travel of the support and each having an aperture adjacent to the support and of a width substantially equal to the width of the sheet or film to be produced, and means whereby the thickness of the body of material delivered to the support from the said reservoirs may be varied.

The means for regulating the thickness of the layer of composition applied may include a spreader associated with a micrometer or other adjusting means for varying the distance between the lower edge of the spreader and the moving support.

Conveniently, in accordance with the invention, the reservoirs for the material may be so arranged that the spreader or spreaders adapted to operate on one or certain of the compositions may divide the reservoir to which a composition is supplied from successive reservoirs.

For convenience a device of this kind may be described as a "casting box" and the casting box, if designed for the application of two compositions, may in effect constitute a channel the base of which is formed by the moving support while the extreme forward wall of the channel constitutes one of the spreaders, a division member located and extending across the channel forming the spreader for the composition which is first applied to the support.

With each of the spreading elements micrometers or equivalent adjusting devices will be associated.

A construction in accordance with the invention is illustrated by way of example in the accompanying drawings, in which:—

Figure 1 is a front elevation of what may be described as a "double casting box";

Figure 2 is a plan;

Figure 3 is a cross-section, and

Figure 4 is a view in elevation and plan of a detail, namely a bracket for securing the box in position.

In the drawings 1 and 1ª are side members to which is readily secured a transverse member 2 from which extend two bridge members 3 and 3ª, the latter being shown broken away. These bridge members connect the transverse member with a bar 4 at the ends of which are located micrometers 5 adapted to bear on abutments fixed relatively to the plane of the endless band acting as a support, indicated by the reference 6. By adjustment of these micrometers the device as a whole may be caused to move about the pivots 7 in the arms 8 which are secured by the brackets 9 to the forward spreader 10 and in this way the distance between the lower edge of the spreader 10 and the band acting as a support may be varied. Between the member 2 and the spreader 10 is located a spreader 11 which is associated with micrometers 12 in the bridge pieces 3 and 3ª. By the adjustment of these micrometers the distance between the lower edge of the spreader in question and the endless band functioning as a support may be varied.

As will be seen, the spreader in question in effect divides the device into two troughs 13 and 13ª to which the compositions are supplied by means of tubes 14 and 14ª opening into the respective troughs.

With a device as illustrated in the drawings the compositions will be supplied to the troughs 13 and 13ª, the lower edge of the spreader 10 being arranged at a distance from the endless band which is greater than the distance between the lower edge of the spreader 11 and the band. The band being set in motion and the compositions being supplied to the troughs, assuming that the spreader 11 is set to allow enough solution from the trough 13 to pass under the spreader to form, say, one-third of the total thickness of the film, the spreader 10 will be set high enough to allow a sufficient quantity of solution to pass under it to complete the film or, in other words, to form a film of the desired thickness. In this way it will be seen two streams of solution in contact will be supplied to the moving support, the lower stream having a start of a fraction of an inch. The solvents will evaporate in the ordinary way.

According to the difference in concentration or composition of the solutions employed, the density and the vapour density of the solvents and so on, there will be more or less diffusion or interspersion from one stream to the other at and beyond the uniting surfaces of the two streams before the actual set of the film, and these factors may be so controlled as to produce the desired result, namely a gradual change in density, flexibility, etc., from one side of the film to the other. If cellulose acetate were the principal cellulose ester employed one or other of the streams of solution could in one way be made to produce a relatively tighter and stronger face of the film by the addition of a proportion of nitrocellulose and a closer and tighter skin by the utilization of a solvent or solvents and plastifiers in appropriate proportions, giving such effects particularly with nitrocellulose or mixtures of nitrocellulose and other cellulose esters or mixtures of cellulose esters other than nitrocellulose or grades of such cellulose esters. It would be possible also, by the addition of suitable oils, gums, gum resins, ester gums, casein or other materials to one or other of the solutions employed, to affect in another way the texture of the skin of the film on one side.

While the above description refers to the production of sheets, pellicles or films, the opposite faces of which possess different mechanical or physical properties, the invention extends to sheets, pellicles or films of compositions of the character specified, the opposite faces of which possess similar mechanical or physical properties while material between the opposite faces varies in a gradual or progressive manner in respect of its properties, and to sheets, pellicles or films generally exhibiting a gradual or progressive variation in the constitution or mechanical or physical properties of the material between their opposite faces.

Generally stated, the materials in accordance with the invention are to be distinguished from sheets, pellicles or films which have been varnished with a cellulose ester or comprise a cellulose ether.

I claim:

1. Sheets of cellulose ester compositions exhibiting a gradual variation in property from one face to the other face of the sheet.

2. The method of forming sheets, pellicles and films from compositions containing cellulose derivatives which comprises applying to a support from which the final product may be stripped a composition containing a cellulose derivative together with a volatile solvent and immediately applying a second composition containing a cellulose derivative together with a volatile solvent on to the surface of the material applied to the support before any portion or material portion of the solvent has evaporated therefrom.

3. The method of forming sheets, pellicles and films from compositions containing cellulose derivatives which comprises applying to a temporary support in substantially immediate succession and in superimposition a plurality of compositions containing cellulose derivatives together with volatile solvents.

In testimony whereof I have signed my name to this specification.

HENRY JAMES HANDS.